(12) United States Patent
Cerri et al.

(10) Patent No.: US 10,099,615 B2
(45) Date of Patent: Oct. 16, 2018

(54) ALL-ROUND VIEW MONITORING SYSTEM FOR A MOTOR VEHICLE

(71) Applicant: VISLAB S.r.l., Parma (IT)

(72) Inventors: Pietro Cerri, Parma (IT); Maria Chiara Laghi, Noceto (IT); Paolo Grisleri, Roveleto di Cadeo (IT); Massimo Bertozzi, Parma (IT); Alberto Broggi, Parma (IT)

(73) Assignee: Ambarella, Inc., Santa Clara, CA (US)

( * ) Notice: Subject to any disclaimer, the term of this patent is extended or adjusted under 35 U.S.C. 154(b) by 273 days.

(21) Appl. No.: 14/867,183

(22) Filed: Sep. 28, 2015

(65) Prior Publication Data

US 2016/0094808 A1 Mar. 31, 2016

(30) Foreign Application Priority Data

Sep. 29, 2014 (IT) .......................... 102014902296849

(51) Int. Cl.
*H04N 7/18* (2006.01)
*B60R 1/00* (2006.01)
*B60R 1/12* (2006.01)
*G06K 9/00* (2006.01)

(52) U.S. Cl.
CPC .................. *B60R 1/00* (2013.01); *B60R 1/12* (2013.01); *H04N 7/181* (2013.01); *B60R 2001/1253* (2013.01); *B60R 2300/105* (2013.01); *B60R 2300/301* (2013.01); *B60R 2300/802* (2013.01); *B60R 2300/8093* (2013.01); *G06K 9/00805* (2013.01)

(58) Field of Classification Search
CPC ..... B60R 1/00; B60R 1/12; B60R 2001/1253; B60R 2300/105; B60R 2300/301; B60R 2300/802; B60R 2300/8093; H04N 7/181; G06K 9/00805
See application file for complete search history.

(56) References Cited

U.S. PATENT DOCUMENTS

| 6,151,539 | A | 11/2000 | Bergholz .................. 701/25 |
| 8,044,781 | B2 | 10/2011 | Laubinger et al. ........... 340/435 |
| 2010/0030473 | A1* | 2/2010 | Au ......................... G01S 17/936 701/301 |
| 2013/0033604 | A1 | 2/2013 | Ohshima et al. ............. 348/148 |

(Continued)

FOREIGN PATENT DOCUMENTS

| EP | 2436577 A2 * | 4/2012 | ........... B62D 15/027 |
| EP | 2579231 A1 | 9/2012 | ............... G08G 1/16 |
| FR | 2958774 | 4/2010 | ............... G06T 7/00 |

*Primary Examiner* — Sathyanaraya V Perungavoor
*Assistant Examiner* — Peet Dhillon
(74) *Attorney, Agent, or Firm* — Christopher P. Maiorana, PC

(57) ABSTRACT

A view monitoring system for a vehicle, comprising four pairs of cameras, a processing unit, a visual display unit, an obstacle detection unit and a signaling unit. The four pairs of cameras may be positioned on a front, rear, and sides of the vehicle and detect images of the same number of areas near the vehicle. The processing unit may be configured to provide a single overall image of the surroundings of the vehicle in response to the images. The visual display unit may display the overall image. The obstacle detection unit may detect obstacles in the overall image. The signaling unit may signal the detected obstacles to the driver.

20 Claims, 4 Drawing Sheets

(56) References Cited

U.S. PATENT DOCUMENTS

| | | | |
|---|---|---|---|
| 2013/0286193 A1* | 10/2013 | Pflug | B60R 1/00 348/135 |
| 2013/0329005 A1 | 12/2013 | Shih et al. | 348/36 |
| 2014/0016857 A1* | 1/2014 | Richards | G06T 7/55 382/154 |
| 2014/0118130 A1* | 5/2014 | Chang | G08G 1/163 340/435 |
| 2014/0210947 A1* | 7/2014 | Finn | G01C 15/002 348/46 |
| 2014/0247352 A1 | 9/2014 | Rathi et al. | 348/148 |

* cited by examiner

ALL-ROUND VIEW MONITORING SYSTEM FOR A MOTOR VEHICLE

This application relates to Italian Application No. 102014902296849, filed Sep. 29, 2014, which is hereby incorporated by reference in its entirety.

FIELD OF THE INVENTION

The object of the present invention relates to an all-around view monitoring system for a motor vehicle. The principal technical field of application of the invention is the automotive sector.

BACKGROUND OF THE INVENTION

Systems capable of monitoring the areas around a vehicle are already known in the automotive sector, particularly the so-called "omnivision" systems, which offer a 360° view around the vehicle itself. An overview of several systems known in patent literature is offered below.

At present, so-called AVM (acronym for "Around View Monitor") systems are widely used. These systems are based on a plurality of cameras installed in different positions on the vehicle and oriented downwards. The cameras supply an image made up of: a first portion, concerning an area to the front of the vehicle according to a view from above and a second portion, concerning an area to the rear of the vehicle and the areas at the sides of the vehicle, according to a view from above.

The image is projected on a display inside the vehicle for the purpose of providing driving support to a driver. In particular, the image is displayed differently based on a type of driving. For example, if the vehicle is proceeding forward, the area in front is displayed in a wider view, whereas if the vehicle is proceeding in reverse the area in the rear is given priority.

An example of an AVM system is proposed in document US 2014/0036063. The main limitation of the example AVM system relates to the fact that it takes a top-view shot of the surroundings of the vehicle, so that objects extending from the ground are distorted when projected in the image on the display. In other words, while objects that are level with the ground, that is, substantially flat, are correctly detected and projected on the display (hypothesis on the removal of perspective), the detection of objects outcropping (or raising) from the ground is not reliable.

In the automotive field, there is an ever-increasing demand for active driving support systems that are capable of reliably monitoring the surroundings of a vehicle for the purpose of detecting and reporting dynamic events (e.g., possible collisions) to the driver so as to assist him/her in making decisions regarding subsequent maneuvers. "Situation awareness" is an expression used in the automotive field precisely to define the perception of elements present in the environment in a volume defined in terms of space and time, an understanding of the meaning of such elements, and the projection of the state thereof in the immediate future. Active driving support systems employ diverse components for the purpose of offering a 360° view of the surroundings of the vehicle, such as cameras located on board the vehicle in various positions, and active sensors such as radar, lidar laser scanners, ultrasonic sensors, etc.

Document U.S. Pat. No. 8,044,781 discloses and claims a system and a method for displaying the surroundings of a vehicle three-dimensionally according to a viewpoint that can be changed based on the driving situation. The system comprises the use of sensor devices capable of measuring the distances of objects present around the vehicle.

The document refers to sensors of various types, such as stereo pairs, radar sensors, lidar sensors, time-of-flight sensors, etc., whose fields of view are partially overlapping. In one embodiment, the sensors are mounted on the rear and on both sides of the vehicle. The sensors communicate with a processor, which, based on the distances detected, generates a three-dimensional reconstruction of the surrounding environment. The three-dimensional reconstruction is presented in the form of a map on a display and is continuously updated, with a viewpoint that is adaptable to the particular driving situation. Based on recognition of the objects and the driving situation, the processor decides which elements to highlight on the three-dimensional map.

Document U.S. Pat. No. 6,151,539 discloses an autonomous vehicle arrangement capable of planning a route in response to receiving travel orders (e.g., point of origin and destination point) as input. The arrangement comprises: at least one range sensor located in the front area of the vehicle, at least one range sensor located in the rear area of the vehicle, a plurality of ultrasonic and/or microwave radar sensors located on the sides of the vehicle, and two cameras, one located in the front area and one in the rear area of the vehicle. However, the arrangement proposed in U.S. Pat. No. 6,151,539 does not provide a 360° view of the surroundings the vehicle.

Document US 2013/0033604 concerns a camera to be installed on each of the rear-viewing side mirror units for use in a so-called "all-around view" system. The system comprises a plurality of cameras mounted on the vehicle to capture a respective number of images, which, suitably combined, make it possible to reconstruct an overall bird's-eye image of the surroundings of the vehicle. The main drawback of the camera proposed in US 2013/0033604 relates to the fact that as the camera is mounted on a rear-viewing side mirror, it is unable to cover the entire area to the side of the vehicle horizontally.

Document US 2013/0329005 also refers to an all-around view system comprising a plurality of cameras and a processing unit that reconstructs a top view of the surroundings of a vehicle. Like all systems that provide a view from above (also known as a "bird's-eye view"), the main disadvantage lies in the distortion of the objects that extend from the ground.

Omnivision systems of the prior art are based on the use of a plurality of monocular cameras or stereoscopic pairs, or they make use of an omnidirectional camera. Moreover, there are also omnivision systems that are based on a plurality of laser scanning sensors that provide partially overlapping fields of view so as to give continuity to the image obtained. This obviously involves the disadvantage of computational complexity, given that the overlapping areas must be processed to eliminate undesired duplication of data. In addition to the drawbacks relating to top views, the all-around view systems of the prior art that employ a plurality of cameras are not capable of providing a complete 360° view of the surroundings of a vehicle. The all-around view in conventional systems leave several blind spots, which can prove to be of critical importance during maneuvers at low speeds such as parking, entering driveways, entering garages, etc.

The all-around view systems based on the use of an omnidirectional camera installed on the vehicle to provide a 360° panoramic view instead suffer from other limitations. The first of such limitations is a low resolution of the camera due to the amplitude of the field of view (view over 360°).

Furthermore, to offer a 360° view, the camera is equipped with hyperbolic mirrors, thereby creating a cumbersome arrangement vulnerable to deterioration from the environment and/or to damage. Lastly, the all-around view systems of the prior art are equipped with a display for viewing the surroundings of a vehicle and obstacles and their distance from the vehicle may be highlighted on the display. However, a mere view of the scene is offered to the driver.

SUMMARY OF THE INVENTION

In this context, the technical task underlying the present invention is to offer an all-around view monitoring system for a motor vehicle that overcomes the above-mentioned drawbacks of the prior art. In particular, the aim of the present invention is to offer an all-around view system for a motor vehicle that is reliable and capable of actively assisting the driver when driving.

The defined technical task and the specified aims are substantially achieved by an all-around view monitoring system for a motor vehicle, comprising a first pair of cameras positioned in a front part of the vehicle for detecting images in an area to a front of the vehicle, a second pair of cameras positioned in a rear part of the vehicle for detecting images in an area to the rear of the vehicle, a third pair of cameras positioned on a first side of the vehicle for detecting images in a first area to the side of the vehicle, a fourth pair of cameras positioned on a second side of the vehicle for detecting images in a second area to the side of the vehicle, a processing unit configured to provide an overall image (e.g., a cloud of points) of the surroundings of the vehicle in response to reception of the images detected by the pairs of cameras, a visual display unit for displaying the overall image (or a processed image thereof), an obstacle detection unit for detecting obstacles in the overall image, and a signaling unit for signaling the detected obstacles to the driver.

The all-around view monitoring system preferably comprises a maneuver setting unit configured to set maneuvers of the vehicle in response to the obstacles detected in the overall image.

The maneuver setting unit preferably comprises a parking space detection block for detecting parking spaces located in the vicinity of the vehicle. In particular, the parking space detection block is configured to detect parking space lines and vacant parking spots on the ground where the vehicle advances.

The all-around view monitoring system preferably comprises a maneuver execution unit configured to automatically execute the maneuvers set by the maneuver setting unit.

In a first embodiment, at least one of the four pairs of cameras is a stereo pair.

Preferably, each one of the pairs of cameras is a stereo pair.

Preferably, all of the cameras are equipped with optical devices so as to obtain a minimum field of view equal to about 100°.

The processing unit is preferably configured to execute at least the following computations on the images detected by the pairs of cameras: rectification, distortion correction, disparity calculation and/or conversion to a cloud of points.

The visual display unit preferably comprises a three-dimensional display and a dedicated processing block that is operatively active on the overall image so as to convert it from a cloud of points to a dense image.

The detection unit preferably comprises an estimation block for estimating the surface area of the ground on which the vehicle advances.

The signaling unit preferably comprises at least one sound emitter that can be located inside the vehicle so as to emit a sound in response to the detection of an obstacle in the overall image.

The signaling unit preferably supplies a message displayed on the three-dimensional display warning the driver of the presence of obstacles.

The signaling unit preferably comprises a module for intervention on the vehicle designed to prevent the opening of one or more doors in the case of detection of obstacles in at least one of the first and the second side area.

The signaling unit is preferably configured to apply augmented reality techniques to the overall image.

In this context, the term "all-around view" monitoring system is understood as a system in which a plurality of cameras are mounted on the vehicle to capture a respective number of images, which, suitably combined, make it possible to reconstruct a top-view image of the surroundings of the vehicle. In this context, the term "sides" of the vehicle is understood as the two flanks of the vehicle. In this context, the term "obstacle" is understood as a stationary obstacle (e.g., a pole, guardrail, a jersey barrier, a vehicle that is not moving, etc.) and as a moving obstacle (e.g. another vehicle, a pedestrian, etc.). In this context, the term "baseline" is understood as the distance between the optical axes of the cameras (including the lenses).

BRIEF DESCRIPTION OF THE DRAWINGS

Further characteristics and advantages of the present invention will become more apparent from the approximate and thus non-limiting description of a preferred, but not exclusive, embodiment of an all-around view monitoring system for a motor vehicle, as illustrated in the accompanying drawings, of which.

DETAILED DESCRIPTION OF EMBODIMENTS

Figure 1:
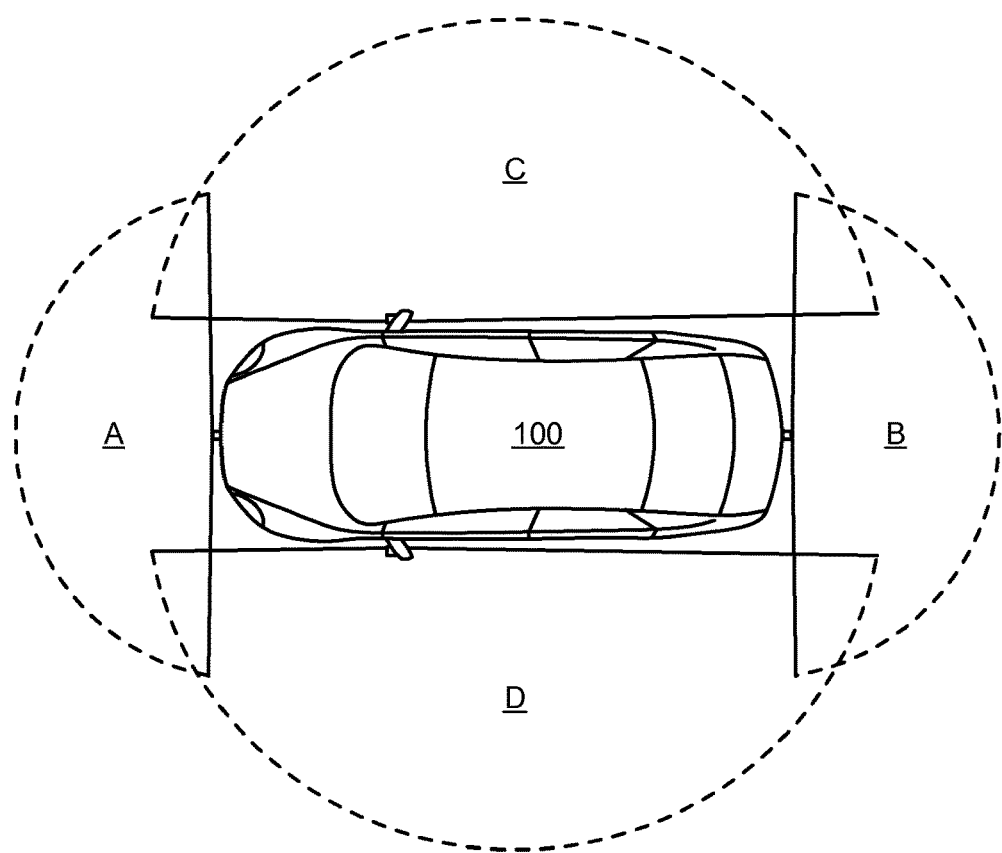
FIG. 1 is a top view schematically illustrating a motor vehicle with the four areas monitored by an all-round monitoring view system, according to the present invention.

With reference to the figures, FIG. 1 indicates an all-around view monitoring system for a motor vehicle 100 such as a car, a bus, a lorry, a road tractor, a tractor trailer, an articulated lorry, a farm machinery, a working vehicle, a self-propelled vehicle, etc.

The all-around view monitoring system comprises at least four pairs of cameras. In particular, a first pair of cameras 2a, 2b may be positioned in a front part 101a of the vehicle 100 for detecting images (e.g., Im2) of an area to the front (e.g., A) of the vehicle 100. The cameras 2a, 2b making up the first pair may be preferably installed on the vehicle 100 in such a manner as to have the optical axes substantially parallel to the ground on which the vehicle 100 advances. Alternatively, the optical axes may be inclined towards the ground by a maximum angle of 45°.

A second pair of cameras 3a, 3b may be positioned in the rear part 102a of the vehicle 100 for detecting images (e.g., Im3) in an area to the rear (e.g., B) of the vehicle 100. The cameras 3a, 3b making up the second pair may be preferably installed on the vehicle 100 in such a manner as to have the optical axes substantially parallel to the ground on which the vehicle 100 advances. Alternatively, the optical axes may be inclined towards the ground by a maximum angle of 45°.

A third pair of cameras 4a, 4b may be positioned on a first side L1 of the vehicle 100 for detecting images (e.g., Im4) in a first area to the side (e.g., D) of the vehicle 100. A fourth pair of cameras 5a, 5b may be positioned on a second side L2 of the vehicle 100 for detecting images (e.g., Im5) in a second area to the side (e.g., C) of the vehicle 100.

Figure 2:
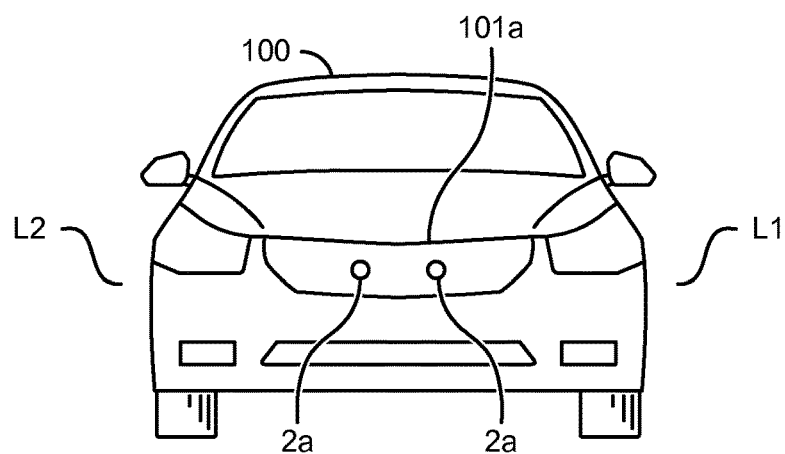
FIG. 2 is a front view illustrating the vehicle appearing in FIG. 1 showing the first pair of cameras of the all-around view monitoring system.
Figure 3:
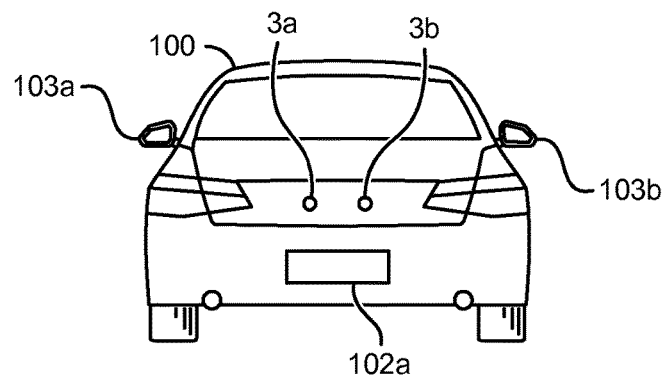
FIG. 3 is a rear view illustrating the vehicle appearing in FIG. 1 showing the second pair of cameras of the all-around view monitoring system.

The first pair of cameras 2a, 2b is preferably positioned in proximity to a grille 101a at the front end of the vehicle 100, as illustrated in FIG. 2. The second pair of cameras 3a, 3b is preferably positioned above a rear number plate 102a of the vehicle 100, as illustrated in FIG. 3. The third pair of cameras 4a, 4b is preferably positioned on a first side rear view mirror 103a of the vehicle, as illustrated in FIG. 4.

Figure 4:
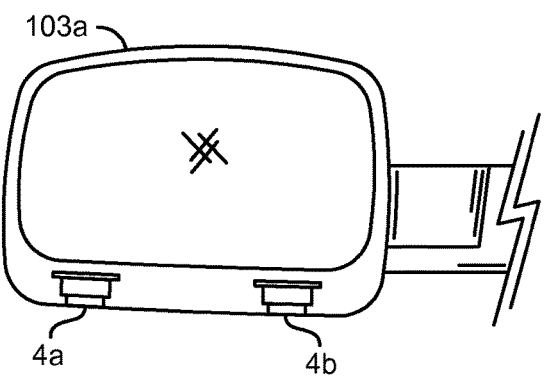
FIG. 4 illustrates a side rear view mirror of the vehicle appearing in FIG. 1 showing the corresponding pair of cameras of the all-around view monitoring system, as seen from one side of the vehicle.

In the example shown in FIG. 4, the cameras 4a, 4b making up the third pair are installed on the first side rear view mirror 103a in such a manner as to have the optical axes substantially orthogonal to the ground on which the vehicle 100 advances. Alternatively, the optical axes may be inclined towards the ground by a maximum angle of 45°.

The fourth pair of cameras 5a, 5b may be preferably positioned on a second side rear view mirror 103b of the vehicle 100. For example, the cameras 5a, 5b making up the fourth pair may be installed on the second side rear view mirror 103b in such a manner as to have the optical axes substantially orthogonal to the ground on which the vehicle 100 advances. Alternatively, the optical axes may be inclined towards the ground by a maximum angle of 45°.

Figure 5:
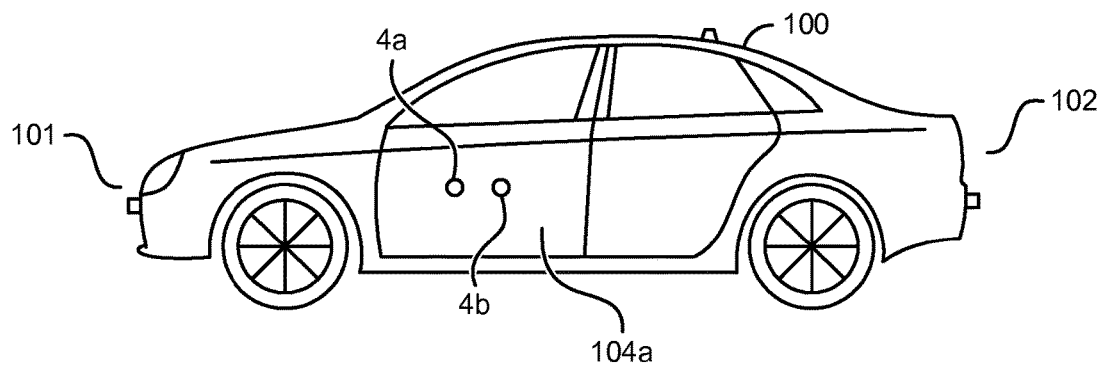
FIG. 5 is a lateral view illustrating the vehicle appearing in FIG. 1 showing the corresponding pair of cameras in the all-around view monitoring system, in a variant embodiment.

Alternatively, the third pair of cameras 4a, 4b may be positioned on a first front door 104a of the vehicle 100, as illustrated in FIG. 5. In the example shown in FIG. 5, the cameras 4a, 4b making up the third pair are installed on the first front door 104a in such a manner as to have the optical axes substantially parallel to the ground on which the vehicle 100 advances. Alternatively, the optical axes may be inclined towards the ground by a maximum angle of 45°.

Likewise, the fourth pair of cameras 5a, 5b may be positioned on a second front door of the vehicle 100. For example, the cameras 5a, 5b making up the fourth pair may be installed on the second front door in such a manner as to have the optical axes substantially parallel to the ground on which the vehicle 100 advances. Alternatively, the optical axes may be inclined towards the ground by a maximum angle of 45°. As an alternative to the front doors, the third and the fourth pairs of cameras 4a, 4b, 5a, 5b may be positioned on the rear passenger doors of the vehicle.

In FIGS. 2-5, the baseline of the pairs of cameras is horizontal. However, an alternative vertical baseline may be implemented. The vertical baseline proves to be particularly advantageous in an example case where the cameras are installed on the front doors of the vehicle 100. The vertical baseline arrangement enables better detection of obstacles such as sidewalks and/or guardrails located in the vicinity of the vehicle 100 during manoeuvres at low speed.

Figure 7:
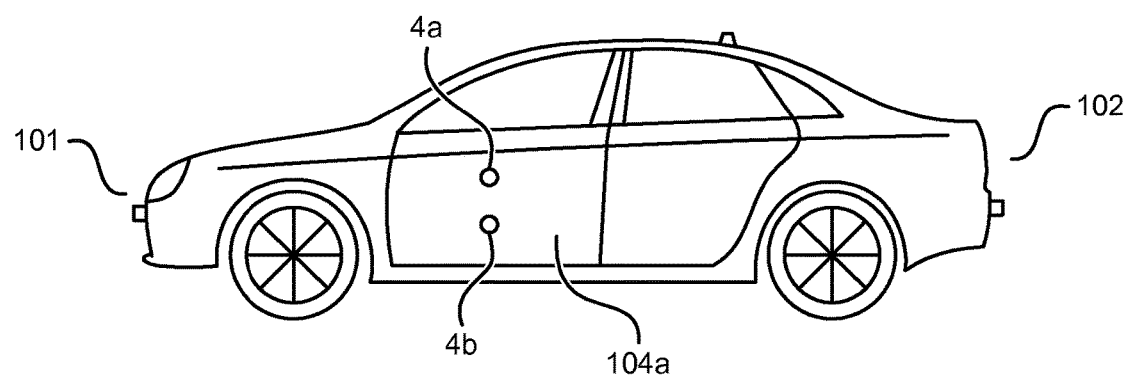
FIG. 7 is a lateral view of a variant embodiment of the vehicle appearing in FIG. 5.

In particular, FIG. 7 illustrates the third pair of cameras 4a, 4b, on the first front door 104a of the vehicle 100 with a vertical baseline. In this case as well, the optical axes may be substantially parallel to the ground or inclined towards the ground by a maximum angle of 45°.

In a first embodiment, at least one of the four pairs of cameras is a stereo pair. Preferably, each one of four pairs of cameras is a stereo pair. In a second embodiment, at least one of the four pairs of cameras comprises two cameras that are synchronized with each other so as to capture the same scene simultaneously. To synchronize the cameras, a synchronization unit may be provided that is operatively active on the cameras making up the synchronized pair. For example, the cameras making up the synchronized pair may be equipped with a trigger input and/or hardware synchronization. Preferably, all four pairs of cameras are synchronized with each other.

The use of cameras having sensors of the CMOS type (acronym for "Complementary Metal Oxide Semiconductor") or of the CCD type (acronym for "Charge Coupled Device") is possible in both the first and the second embodiment. In particular, in the first embodiment, the pairs of stereo cameras may have a CMOS Gigabit Ethernet interface. In some embodiments, stereo cameras with other communication interfaces such as firewire, USBs and/or analog interface may be used. Lastly, the cameras may consist of color cameras, grey scale cameras, NIR tail and/or thermal imaging cameras. Given that the types of cameras mentioned hereinabove are all known in the prior art, they are not described in further detail below.

Preferably, all the cameras are equipped with optical devices so as to obtain a minimum field of view equal to about 100°. For example, the optical devices can consist of fish-eye lenses, which make it possible to achieve a field of view as wide as about 180° and beyond. Alternatively, the optical devices can consist of pin-hole lenses, which make it possible to achieve a field of view as wide as about 140°. For pin-hole lenses, blind spots may be considered as negligible in any case. Preferably, in the first embodiment, fish-eye lenses may be employed for the first and second pair of stereo cameras 2a, 2b, 3a, 3b, whereas pin-hole lenses may be employed for the third and fourth pair of stereo cameras 4a, 4b, 5a, 5b.

For each pair of cameras (equipped with the corresponding optical devices), the baseline ranges between 5 cm and 20 cm, approximately. In an example in which the third and the fourth pair of cameras 4a, 4b, 5a, 5b are positioned on the side rear view mirrors 103a, 103b, the maximum limit of the baseline may be dictated by the dimensions of the mirrors 103a, 103b. For example, the baseline may not exceed 15 cm, approximately. The resolution of the employed cameras may range from a minimum of 320×240 to a maximum of 1280×1024. The area covered by each pair of cameras may be equal to at least 5 m.

Figure 6:
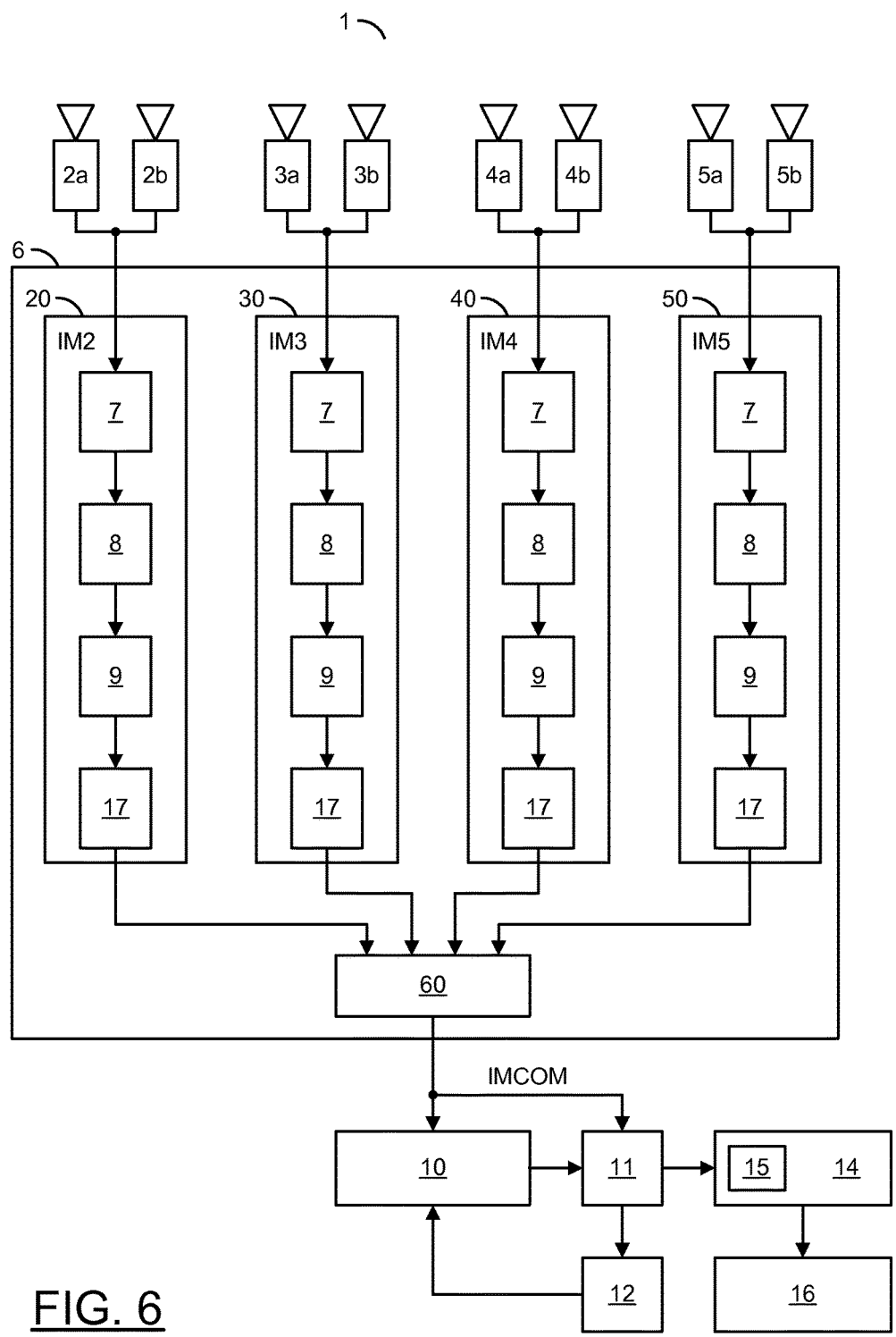
FIG. 6 is a block diagram of the all-around view monitoring system, according to the present invention.

Referring to FIG. 6, the all-around view monitoring system 1 comprises a processing unit 6 configured to provide an overall image (e.g., Imcom) of the surroundings of the vehicle 100 in response to reception of the images Im2, Im3, Im4, Im5 detected by the four pairs of cameras. In particular, the processing unit 6 may be configured to execute at least the following computations on the images Im2, Im3, Im4, Im5: rectification, distortion correction, disparity calculation and/or passage (or conversion) to a cloud of points. For example, the processing unit 6 comprises dedicated computation blocks 20, 30, 40 and 50 for each pair of cameras. Each computation block 20, 30, 40 and 50 in turn may comprise a rectification block 7, a distortion correction block 8, a disparity calculation block 9 and a point cloud computation block 17.

Rectification may be implemented due to the fact that the cameras making up each pair may not have perfectly aligned optical axes. Rectification takes place according to known algorithms or combinations of known algorithms. For example, rectification comprises rotational translation and straightening of the acquired images.

Distortion correction may be implemented to remove distortion introduced by the optical devices (e.g., lenses) located on the cameras. In one embodiment, rectification and distortion correction may be carried out simultaneously using a so-called "look-up table". The look-up table may associate a rectified and distortion-corrected position with each position of the original image.

Disparity calculation is preferably carried out using an algorithm based on SGM (acronym for "Semi-Global Matching) of known type. Alternatively, a dense or non-dense stereo algorithm may be used. In a disparity image, each pixel represents a disparity value for the corresponding point. The cloud of points may be a conversion from the disparity image. The cloud of points may be a list of points in three dimensions.

Moreover, the processing unit 6 comprises a composition block 60, which receives the point clouds (e.g., the cloud of points) from the dedicated computation blocks 20, 30, 40, and 50 and merges the point clouds according to known techniques, supplying the overall image Imcom as output. The overall image Imcom substantially appears as a point cloud that is a reconstruction of the surroundings of the vehicle 100.

The processing unit 6 has been presented as being subdivided into separate functional blocks (e.g., dedicated computation blocks 20, 30, 40, 50 and a composition block 60) to provide a clearer and more immediate understanding of the individual functions of the processing unit 6. However, the processing unit 6 may be constituted by a single electronic device, suitably programmed for carrying out the functions described, and the individual blocks may correspond to a hardware entity and/or software routine that may be part of the programmed device. For example, the processing unit 6 may be implemented using an FPGA (acronym for "Field Programmable Gate Array"). Alternatively or additionally, the functions of the processing unit 6 may be carried out by a plurality of electronic devices on which the above-mentioned functional blocks may be distributed. The processing unit 6 may also make use of one or more processors for execution of the instructions contained in memory modules.

The overall image Imcom may be displayed on a visual display unit 10. The visual display unit 10 preferably comprises a three-dimensional display. The overall image Imcom may be preferably processed before being displayed. In particular, the visual display unit 10 comprises a dedicated processing block (unillustrated) that is operatively active on the overall image Imcom so as to convert the overall image Imcom from a cloud of points to a dense image. For example, the dedicated processing block of the visual display unit 10 may be configured to apply the Voronoi tessellation technique. For example, the visual display unit 10 may be a three-dimensional tablet.

In some embodiments, the all-around view monitoring system 1 also comprises a detection unit 11 for detecting obstacles in the overall image Imcom and/or a signaling unit 12 for signaling the detected obstacles to the driver. For example, the detection unit 11 may comprise an estimation block for estimating a surface area of the ground on which the vehicle 100 advances.

The signaling unit 12 may be preferably configured to apply augmented reality techniques to the overall image Imcom (e.g., the point cloud) for the purpose of highlighting the detected obstacles directly on the image displayed on the three-dimensional display. For example, the detected obstacles may be displayed by means of color maps and/or framing directly on the image appearing on the display.

In one embodiment, the signaling unit 12 comprises at least one sound emitter that may be located inside the vehicle 100 so as to emit a sound in response to the detection of an obstacle in the overall image Imcom. Alternatively or in combination with the sound signal, the signaling unit 12 supplies a message warning the driver of the presence of obstacles. The message may be displayed on the display. Alternatively or in combination with the sound and visual signal, in an example of detection of an obstacle in proximity to one of the doors of the vehicle 100, the signaling unit 12 intervenes by preventing the door from opening. In particular, the signaling unit 12 comprises a module for intervention on the vehicle 100 designed to prevent an opening of one or more doors in a case of detection of obstacles in the side area C and/or in the side area D.

Advantageously, the all-around view monitoring system 1 comprises a manoeuver setting unit 14 configured to set the maneuvers of the vehicle 100 in response to the obstacles detected in the overall image Imcom. For example, the maneuver setting unit comprises a parking space detection block 15 for detecting parking spaces located in the vicinity of the vehicle 100. The parking space detection block 15 may be configured to detect parking space lines on the ground (e.g., parallel, perpendicular and echelon or angle parking spaces) and vacant parking spaces. Once a vacant parking space has been detected, the maneuver setting unit 14 prepares the vehicle 100 for carrying out the parking maneuver.

The all-around view monitoring system 1 preferably comprises a maneuver execution unit 16 configured to automatically execute the maneuvers set by the maneuver setting unit 14. For example, once the vehicle 100 has been prepared for carrying out the parking maneuver, the maneuver execution unit 16 establishes a maneuvering path, checks for the absence of obstacles on the maneuver path and automatically enables the vehicle 100 to complete the maneuvering path leading into the vacant parking space.

Prior to completing the maneuvering path, the vehicle 100 may be located using a GPS device and/or a previously saved three-dimensional map. Preferably, the maneuver execution unit 16 may be capable of driving the vehicle 100 not only in parking maneuvers, but also in other types of maneuvers at low speed, such as entering a driveway and/or a garage.

The characteristics of an all-round view monitoring system for a motor vehicle, according to the present invention, prove to be clear from the description provided as do the advantages thereof. In particular, starting from the overall image (e.g., the point cloud surrounding the vehicle), the all-round view monitoring system proposed herein is capable of detecting obstacles and signaling them to the driver (e.g., at a visual or audio level).

It should be noted that the overall image is a reconstruction of the surroundings of the vehicle according to viewpoints located at the height of the vehicle (e.g., grille at the front end, above the rear number plate, and side rear view mirrors) and therefore the overall image is free of the problems typical of the omnidirectional systems that have cameras located on the roof and oriented downwards. Moreover, the monitoring system may perform the setting of and/or automatically perform simple maneuvers and/or other low-speed maneuvers. In conclusion, the view monitoring system is a driving support system that is more reliable and complete than those presently known. Furthermore, the cameras may be installed in areas of the vehicle that will not impact aerodynamics and/or aesthetics. The cameras may obtain a complete view (e.g., with negligible blind spots) of the surroundings of the vehicle.

The invention claimed is:

1. An apparatus comprising:
   a plurality of stereo cameras positioned on a vehicle and configured to generate a plurality of images of an environment in an area surrounding said vehicle, wherein each of said stereo cameras comprises two cameras having respective optical axes separated by a corresponding distance;
   a plurality of first circuits each connected to a respective one of said stereo cameras to receive said images, said first circuits (i) operating in parallel and (ii) configured to generate a plurality of intermediate point clouds in parallel in response to said images, wherein each of said intermediate point clouds corresponds to one of said stereo cameras;
   a second circuit configured to generate a point cloud representative of said environment in three dimensions by merging said intermediate point clouds;
   a third circuit configured to estimate a surface area of a ground in said area based on said point cloud; and
   a fourth circuit configured to detect one or more parking spaces located in said area surrounding said vehicle based on said point cloud.

2. The apparatus according to claim 1, wherein said third circuit is further configured to detect one or more obstacles in said parking spaces based on said point cloud.

3. The apparatus according to claim 2, wherein said fourth circuit is further configured to set one or more parking maneuvers of said vehicle that maneuver said vehicle into a vacant one of said parking spaces in response to said obstacles.

4. The apparatus according to claim 3, further comprising a fifth circuit configured to automatically drive said vehicle into said vacant parking space based on said parking maneuvers set by said fourth circuit.

5. The apparatus according to claim 1, wherein said first circuits are further configured to process said images by executing at least one of a rectification, a distortion correction, and a disparity calculation.

6. The apparatus according to claim 1, further comprising a display configured to display a three-dimensional image of said environment based on said point cloud.

7. The apparatus according to claim 1, wherein said vehicle advances in said surface area of said ground.

8. The apparatus according to claim 2, further comprising a sound emitter configured to emit a sound inside said vehicle in response to detection of said obstacles in said parking spaces.

9. The apparatus according to claim 2, further comprising a fifth circuit configured to present a message to a display that warns a driver of said vehicle about a presence of said obstacles in said parking spaces.

10. The apparatus according to claim 2, further comprising a fifth circuit configured to prevent an opening of one or more doors of said vehicle in response to detection of one or more of said obstacles in proximity to said one or more doors.

11. The apparatus according to claim 1, further comprising a fourth fifth circuit configured to apply one or more augmented reality techniques to said point cloud.

12. A method for monitoring, comprising the steps of:
   generating a plurality of images of an environment in an area surrounding a vehicle using a plurality of stereo cameras positioned on said vehicle, wherein each of said stereo cameras comprises two cameras having respective optical axes separated by a corresponding distance;
   receiving said images at a plurality of circuits each being connected to a respective one of said stereo cameras;
   generating a plurality of intermediate point clouds in parallel in response to said images using said circuits operating in parallel, wherein each of said intermediate point clouds corresponds to one of said stereo cameras;
   generating a point cloud representative of said environment in three dimensions by merging said intermediate point clouds;
   estimating a surface area of a ground in said area based on said point cloud; and
   detecting one or more parking spaces located in said area surrounding said vehicle based on said point cloud.

13. The method according to claim 12, further comprising the step of:
   detecting one or more obstacles in said parking spaces based on said point cloud.

14. The method according to claim 13, further comprising the step of:
   setting one or more parking maneuvers of said vehicle that maneuver said vehicle into a vacant one of said parking spaces in response to said obstacles.

15. The method according to claim 14, further comprising the step of:
   automatically driving said vehicle into said vacant parking space based on said parking maneuvers.

16. The method according to claim 12, wherein said vehicle advances in said surface area of said ground.

17. The method according to claim 13, further comprising the step of:
   emitting a sound inside said vehicle in response to detection of said obstacles in said parking spaces.

18. The method according to claim 13, further comprising the step of:
   presenting a message to a display that warns a driver of said vehicle about a presence of said obstacles in said parking spaces.

19. The method according to claim 13, further comprising the step of:
   preventing an opening of one or more doors of said vehicle in response to detection of one or more of said obstacles in proximity to said one or more doors.

20. The method according to claim 12, further comprising the step of:
   applying one or more augmented reality techniques to said point cloud.

* * * * *